United States Patent
DiRenzo et al.

(10) Patent No.: US 7,746,962 B2
(45) Date of Patent: Jun. 29, 2010

(54) APPARATUS AND METHOD OF DETECTION FOR A PACKET-BASED WIRELESS RECEIVER EMPLOYING MULTIPLE, CONCURRENT TRANSMITTED STREAMS

(75) Inventors: Michael T. DiRenzo, Coppell, TX (US); David P. Magee, Plano, TX (US); Manish Goel, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1248 days.

(21) Appl. No.: 10/992,404

(22) Filed: Nov. 17, 2004

(65) Prior Publication Data

US 2006/0104393 A1    May 18, 2006

(51) Int. Cl.
*H04L 27/06* (2006.01)
(52) U.S. Cl. .................... 375/343; 375/142; 375/143; 375/150
(58) Field of Classification Search .............. 375/142, 375/150, 343
See application file for complete search history.

(56) References Cited

U.S. PATENT DOCUMENTS

| | | | |
|---|---|---|---|
| 6,590,889 B1 * | 7/2003 | Preuss et al. ................ | 370/342 |
| 7,065,156 B1 * | 6/2006 | Kuchi ......................... | 375/299 |
| 2003/0128746 A1 * | 7/2003 | Lerner et al. ................ | 375/148 |
| 2004/0042534 A1 * | 3/2004 | Raphaeli et al. ............. | 375/150 |

* cited by examiner

*Primary Examiner*—David C Payne
*Assistant Examiner*—Leon Flores
(74) *Attorney, Agent, or Firm*—Steven A. Shaw; W. James Brady; Frederick J. Telecky, Jr.

(57) ABSTRACT

The present invention provides a packet detector for use with a packet-based wireless receiver employing a receive antenna for P concurrently transmitted streams, where P is at least two. In one embodiment, the packet detector includes a correlation unit coupled to the single receive antenna and configured to provide a correlation function based on P acquisition fields corresponding to the P concurrently transmitted streams. Additionally, the packet detector also includes a pseudo-magnitude calculator coupled to the correlation unit and configured to calculate a packet detection metric based on the correlation function.

4 Claims, 2 Drawing Sheets

APPARATUS AND METHOD OF DETECTION FOR A PACKET-BASED WIRELESS RECEIVER EMPLOYING MULTIPLE, CONCURRENT TRANSMITTED STREAMS

TECHNICAL FIELD OF THE INVENTION

The present invention is directed, in general, to a communication system and, more specifically, to a packet detector, a method of packet detection and a packet-based wireless receiver employing the detector or the method.

BACKGROUND OF THE INVENTION

Expansion of the wireless communication arena is being driven by an increasing demand for wireless devices along with improvements in wireless communications platforms and systems. Users may exchange information through pagers, cellular telephones, other wireless communications and computer based products. Wireless communication provides users the benefit of exchanging personal and business information employing wireless networks such as a wireless local area network (WLAN). A WLAN provides flexibility and mobility for users by enabling access to a spectrum of communication and computer networks, including the Internet, without being restricted to a wired network.

Several standards have been established to provide uniformity and support growth in the development of wireless networks. One such standard that has been promulgated by the Institute of Electrical and Electronic Engineers (IEEE) is IEEE 802.11, which is incorporated herein by reference. IEEE 802.11 is an overarching standard that encompasses a family of specifications pertaining to packet-based wireless communication. Generally, IEEE 802.11 specifies an over-the-air interface between a wireless client and a base station or between two wireless clients.

Within the IEEE 802.11 family are several specifications, such as IEEE 802.11a/b/g, covering areas such as different transmission rates, encoding schemes and frequency bands for transmitting data wirelessly. Performance of the packet-based wireless network is dependent on reliable detection of the transmitted packets. Much work has been done in this area for a packet-based wireless receiver employing a single transmitted stream. However, when multiple concurrent transmitted streams are employed, the packet-based single receiver is typically not equipped to detect these transmitted streams reliably.

Accordingly, what is needed in the art is an improved way for a packet-based wireless receiver to reliably detect multiple, concurrent transmitted streams.

SUMMARY OF THE INVENTION

To address the above-discussed deficiencies of the prior art, the present invention provides a packet detector for use with a packet-based wireless receiver employing a receive antenna for P concurrently transmitted streams, where P is at least two. In one embodiment, the packet detector includes a correlation unit coupled to the receive antenna and configured to provide a correlation function based on P acquisition fields corresponding to the P concurrently transmitted streams. Additionally, the packet detector also includes a pseudo-magnitude calculator coupled to the correlation unit and configured to calculate a packet detection metric based on the correlation function.

In another aspect, the present invention provides a method of packet detection for use with a packet-based wireless receiver employing a receive antenna for P concurrently transmitted streams, where P is at least two. In one embodiment, the method includes providing a correlation function based on P acquisition fields corresponding to the P concurrently transmitted streams and calculating a packet detection metric based on the correlation function.

The present invention also provides, in yet another aspect, a packet-based wireless receiver for P concurrently transmitted streams, where P is at least two. The packet-based wireless receiver employs a radio demodulation section employing a receive antenna, and an analog-to-digital converter (ADC) coupled to the radio demodulation section. The packet-based wireless receiver also includes a packet detector coupled to the ADC having a correlation unit that provides a correlation function based on P acquisition fields corresponding to the P concurrently transmitted streams and a pseudo-magnitude calculator, coupled to the correlation unit, that calculates a packet detection metric based on the correlation function.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 3 illustrates a diagram of a portion of a receiving system employing an embodiment of a packet detector and constructed in accordance with the principles of the present invention;

FIG. 4 illustrates a diagram of a portion of a receiving system employing an alternative embodiment of a packet detector and constructed in accordance with the principles of the present invention.

DETAILED DESCRIPTION

Figure 1:
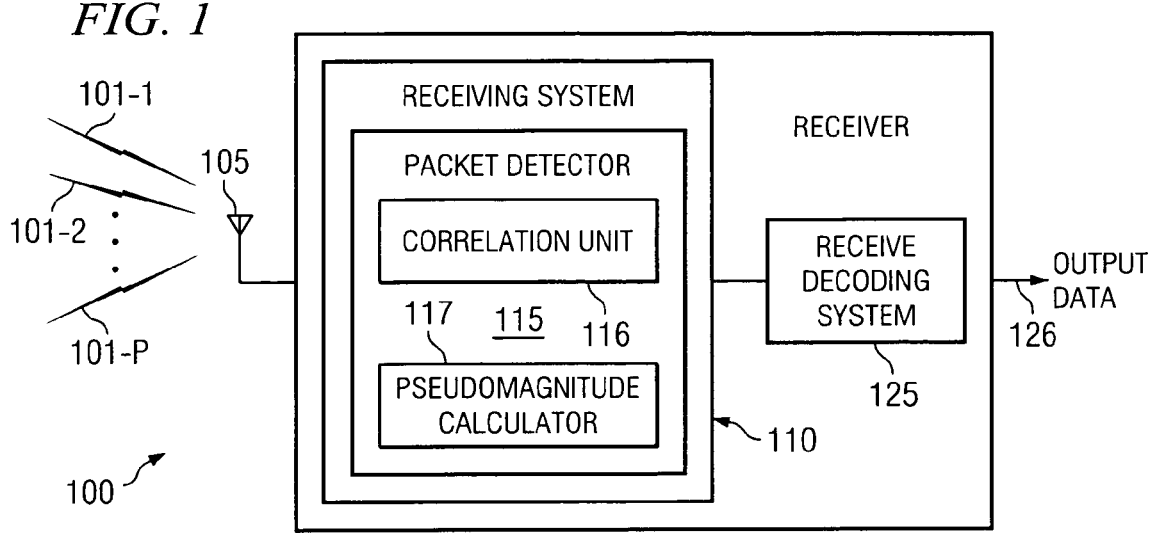
FIG. 1 illustrates a diagram of an embodiment of a packet-based wireless receiver constructed in accordance with the principles of the present invention.

Referring initially to FIG. 1, illustrated is a diagram of an embodiment of packet-based wireless receiver, generally designated 100, constructed in accordance with the principles of the present invention. The packet-based wireless receiver 100 includes a receive antenna 105 coupled to a receiving system 110, a packet detector 115 and a receive decoding system 125 that provides output data 126. The receive antenna 105 receives P concurrently transmitted streams, where P is at least two, that are collectively designated the P concurrently transmitted streams 101-1/101-P, as shown.

Although not specifically shown in FIG. 1, the receiving system 110 employs a radio demodulator section, an analog-to-digital converter (ADC) section, a matched filter section and a Fast Fourier Transform (FFT) section. The receiving system 110 is coupled to the receive decoding system 125, which employs a channel estimation section, a noise estimation section, a subchannel demodulator section and a decoder that provides the output data 126. The radio demodulator section receives the P concurrently transmitted streams from the receive antenna 105 and provides them to the ADC section. The packet detector 115 is coupled to the radio demodulator and the ADC sections of the receiving system 110 and provides a packet detection signal for use by the receive decoding system 125 to indicate that a transmitted packet has been received.

Figure 2:
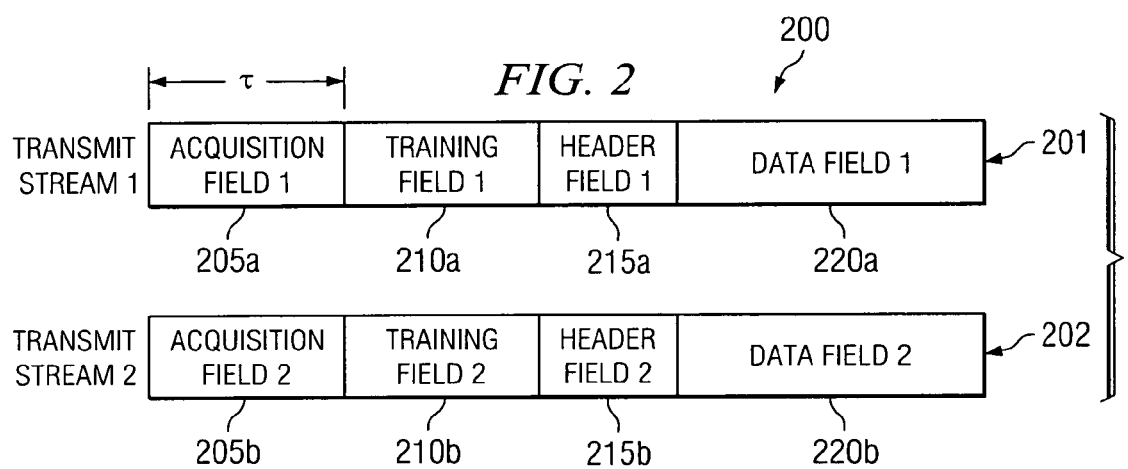
FIG. 2 illustrates a diagram of an embodiment of a transmission frame format employable with a packet detector and constructed in accordance with the principles of the present invention.

Turning momentarily to FIG. 2, illustrated is a diagram of an embodiment of a transmission frame format, generally designated 200, employable with a packet detector and constructed in accordance with the principles of the present invention. The transmission frame format 200 employs a typical structure associated with a wireless packet and includes first and second transmission frames 201, 202 that are associated with first and second concurrently transmitted streams as was discussed with respect to FIG. 1 where P is equal to two.

These transmitted signals concurrently occupy the same frequency band and are coherently transmitted with a known temporal relationship between the two transmitted streams. The first and second transmission frames 201, 202 include first and second acquisition fields 205a, 205b, first and second training fields 210a, 210b, first and second header fields 215a, 215b and first and second data fields 220a, 220b. The first and second acquisition fields 205a, 205b, the first and second training fields 210a, 210b and the first and second header fields 215a, 215b constitute first, second and third preamble fields.

The first and second acquisition fields 205a, 205b are employed for detection of a valid packet and for establishing an automatic gain control in a receiver such as the packet-based wireless receiver 100 of FIG. 1. The first and second training fields 210a, 210b are employed for estimation or equalization of the wireless channel characteristics needed for successful decoding of the first and second data fields 215a, 215b. The first and second header fields 215a, 215b denote how many data symbols are in the first and second data fields 220a, 220b, and the type of coding used. Contents of the first and second acquisition fields 205a, 205b and the first and second training fields 210a, 210b are known by the receiver a priori.

Returning now to FIG. 1, the packet detector 115 includes a correlation unit 116 and a pseudo-magnitude calculator 117. The correlation unit 116 provides a correlation function based on the P acquisition fields corresponding to the P concurrently transmitted streams. The pseudo-magnitude calculator 117 is coupled to the correlation unit 116 and calculates a packet detection metric based on the correlation function. In the illustrated embodiment, the packet-based wireless receiver 100 employs a matched filter section and a matched filter correlation to provide the correlation function.

In one embodiment, the correlation unit 116 employs P parallel correlations corresponding to each of the P acquisition fields to provide the correlation function. In this embodiment, the P acquisition fields are independently transmitted sequences. Then, the pseudo-magnitude calculator 117 calculates the packet detection metric employing a summation of the P parallel correlations. In an alternative embodiment, the correlation unit 116 employs a single correlation. For this case, the P acquisition fields employ a single sequence and P circular-shifted repetitions of this sequence in the correlation function. Then, the pseudo-magnitude calculator 117 calculates the packet detection metric based on the single correlation, which employs a summation of the sequence and the time delayed repetition of the sequence. In each of these embodiments, the pseudo-magnitude calculator 117 may further employ a threshold circuit. The threshold circuit provides a packet detection signal when the packet detection metric is greater than a threshold value.

Figures 3, 4:
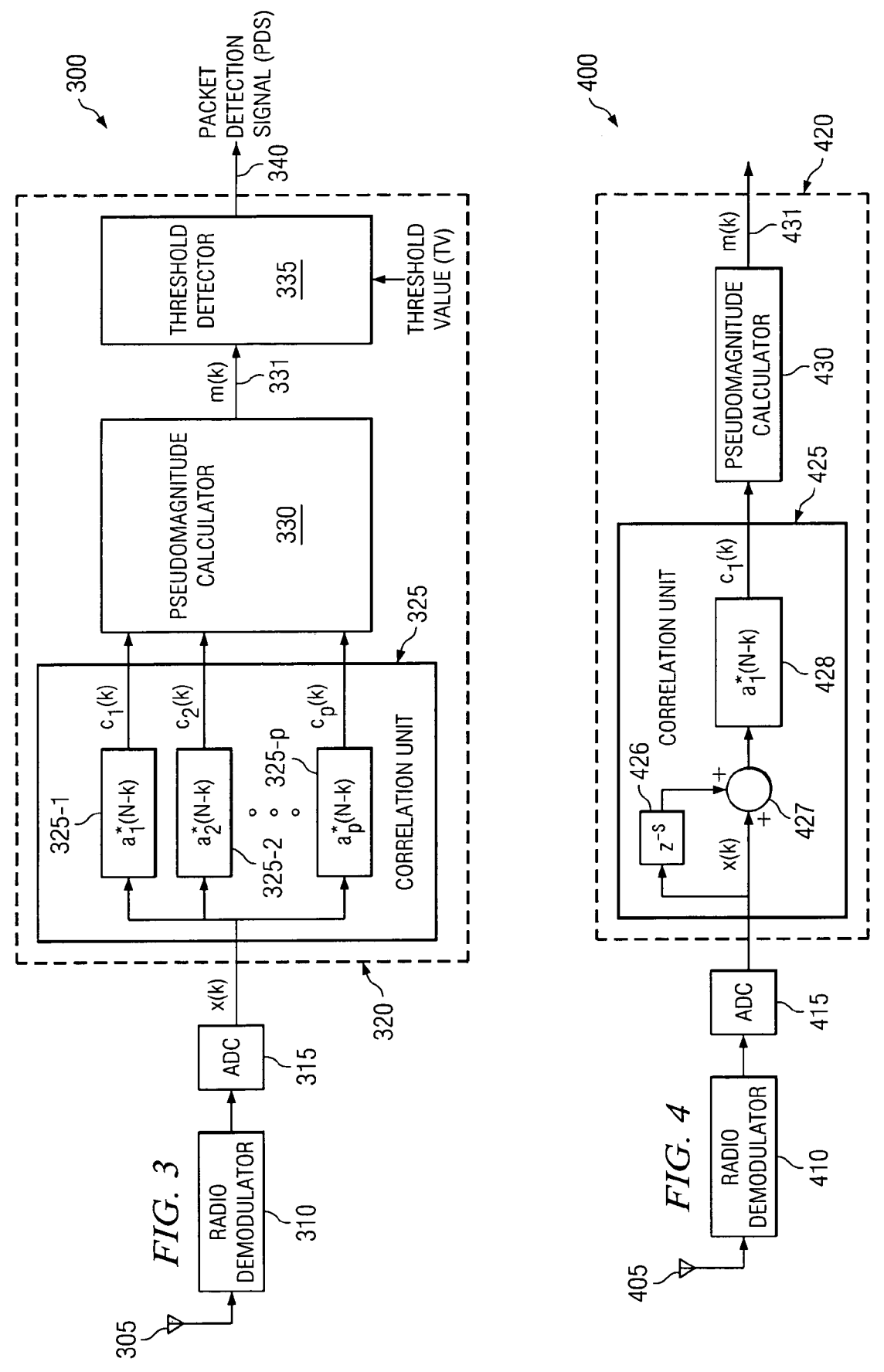

Turning now to FIG. 3, illustrated is a diagram of a portion of a receiving system, generally designated 300, employing an embodiment of a packet detector 320 and constructed in accordance with the principles of the present invention. The receiving system portion 300 includes a receive antenna 305, a radio demodulator 310, an ADC 315 and the packet detector 320. The packet detector 320 includes a correlation unit 325, a pseudo-magnitude calculator 330 and a threshold detector 335 having an output 340 that provides a packet detect signal PDS. The correlation unit 325 includes P matched filter correlators 325-1/325-P, where P is at least two. Each of the P matched filter correlators 325-1/325-P corresponds to one of P acquisition fields that are associated with P concurrently transmitted streams.

For the case where P equals two, as was discussed with respect to FIG. 2, first and second digital baseband signals $a_1(k)$ and $a_2(k)$, which consist of complex (i.e., real and imaginary parts) data values, are transmitted during the first and second acquisition fields 205a, 205b. Given first and second acquisition fields 205a, 205b with length $\tau$ and a sampling rate $F_s$, the number of samples in each of the digital baseband signals is L, where $L=F_s*\tau$ and k denotes the sample number. An ADC output sequence x(k) at the receiver represents complex data samples that contain channel filter versions of the first and second sampled data sequences $a_1(k)$ and $a_2(k)$ and may be defined for presentation to the correlation unit 325. This example would employ first and second matched filter correlators 325-1, 325-2.

Generally, for P acquisition fields associated with P concurrently transmitted streams, a matched filter correlation $c_i(k)$ for the acquisition field of the $i^{th}$ transmitted stream may be expressed as:

$$c_i(k) = \sum_{n=0}^{N-1} x(k-n)a_i^*(N-k), \quad (1)$$

where $N \leq L$ is the length of the matched filter correlation and "*" denotes complex conjugation. In the illustrated embodiment, a correlation function having P parallel matched filter correlations is performed with the P matched filter correlators 325-1/325-P of the correlation unit 325 employing the form of equation 1 for each acquisition sequence.

Each of the P matched filter correlations are provided to the pseudo-magnitude calculator 330 as inputs. The pseudo-magnitude calculator 330 calculates a packet detection metric m(k) based on equation (2) below:

$$m(k) = \sum_{i=1}^{P} (|\text{Re}[c_i(k)]| + |\text{Im}[c_i(k)]|), \qquad (2)$$

where P is again the number of transmitted streams in the receive signal. The packet detect signal PDS is true when the packet detection metric m(k) exceeds a threshold value TV. The threshold value TV may be empirically determined to be an appropriate percentage of a maximum packet detection metric $m(k)_{MAX}$.

Turning now to FIG. 4, illustrated is a diagram of a portion of a receiving system, generally designated 400, employing an alternative embodiment of a packet detector 420 and constructed in accordance with the principles of the present invention. The receiving system portion 400 includes a receive antenna 405, a radio demodulator 410, an ADC 415 and the packet detector 420. The packet detector 420 includes a correlation unit 425 and a pseudo-magnitude calculator 430 having an output 431 that provides a packet detection metric m(k). The correlation unit 425 includes a delay element 426, a summing junction 427 and a single matched filter correlator 428 that provides a single matched filter correlation to the pseudo-magnitude calculator 430.

For the special case where the P acquisition sequences employ circular-shifted repetitions or versions of the same sequence, the packet detector may be simplified, as shown in FIG. 4. Again, for P equal to two as was discussed with respect to FIG. 2, first and second digital baseband signals $a_1(k)$ and $a_2(k)$ are transmitted during the first and second acquisition fields 205a, 205b. However, for this embodiment, the digital baseband signals are defined by the relationship:

$$a_2(k) = a_1((k-S)_N) \qquad (3)$$

where S is the number of samples for the circular-shift of the acquisition sequence for the second transmit stream and $(\ )_N$ denotes the modulo-N operation.

The ADC output x(k) representing complex ADC samples of the received first and second sampled data values $a_1(k)$ and $a_2(k)$ employ a unit delay $z^{-s}$ provided by the delay element 426 before they are added together in the summing junction 427 and provided to the single matched filter correlator 428. Applying an acquisition sequence and its circular-shifted repetition to the correlation unit 425 provides a correlation signal that is representative of the circular-shifted acquisition sequences. This may be employed by the pseudo-magnitude calculator 430 to provide a packet detection metric m(k) that indicates a detected packet. Of course, a threshold detector may also be employed to provide a packet detection signal, as appropriate to a particular application.

Figure 5:
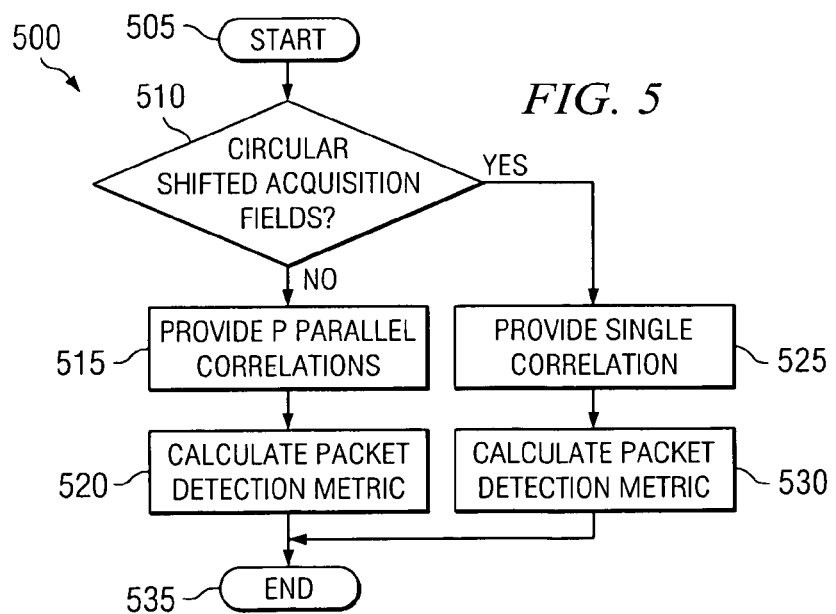
FIG. 5 illustrates a flow diagram of an embodiment of a method of packet detection carried out in accordance with the principles of the present invention.

Turning now to FIG. 5, illustrated is a flow diagram of an embodiment of a method of packet detection, generally designated 500, carried out in accordance with the principles of the present invention. The method 500 starts in a step 505 and is for use with a packet-based wireless receiver employing a receive antenna for receiving a multiplicity of P concurrently transmitted streams, where P is at least two. In a decisional step 510, it is determined whether acquisition fields are circular-shifted versions of a single sequence.

If P unique acquisition fields are employed, a correlation function employing P parallel correlations is provided in a step 515. The results of the P parallel correlations are employed to calculate a packet decision metric in a step 520. The packet decision metric may be employed with a threshold value to provide a packet detection signal. The method 500 ends in a step 535.

If the decisional step 510 determines that P acquisition fields are circular-shifted versions of a single sequence, then a single correlation is provided in a step 525. The single correlation in the step 525 accommodates P acquisition fields that employ a sequence and a circular-shifted repetition of the sequence. A step 525 employs this single correlation to provide the packet detection metric. The method 500 again ends in a step 535.

While the method disclosed herein has been described and shown with reference to particular steps performed in a particular order, it will be understood that these steps may be combined, subdivided, or reordered to form an equivalent method without departing from the teachings of the present invention. Accordingly, unless specifically indicated herein, the order or the grouping of the steps are not limitations of the present invention.

In summary, embodiments of the present invention employing a packet detector, a method of packet detection and a packet-based wireless receiver employing the detector or the method have been presented. Advantages include the ability to detect a packet where multiple concurrently transmitted streams are accommodated with a single receiving system. Embodiments that accommodate multiple acquisition fields that employ independent sequences as well as a single sequence and a circular-shifted repetition of this sequence, which are associated with concurrently transmitted streams, have been presented.

Although the present invention has been described in detail, those skilled in the art should understand that they can make various changes, substitutions and alterations herein without departing from the spirit and scope of the invention in its broadest form.

What is claimed is:

1. A method of packet detection for use with a packet-based wireless receiver employing a receive antenna for P concurrently transmitted streams, where P is at least two, comprising:
    receiving P concurrently transmitted streams, where P is at least two, and wherein the P concurrently transmitted streams occupy the same frequency band and coherently transmitted with a known temporal relationship between the P concurrently transmitted streams;
    providing a correlation function based on P acquisition fields corresponding to said P concurrently transmitted streams employing a single correlation corresponding to said P acquisition fields having a sequence and P circular-shifted repetitions of said sequence; and
    calculating a packet detection metric based on said correlation function based on said single correlation employing a summation of said sequence and said P circular-shifted repetitions of said sequence.

2. The method as recited in claim 1 wherein said calculating said packet detection metric further employs a threshold value to provide a packet detection signal.

3. A packet-based wireless receiver comprising:
    a radio demodulation section employing a receive antenna for receiving P concurrently transmitted streams, where P is at least two and wherein the P concurrently transmitted streams occupy the same frequency band and coherently transmitted with a known temporal relationship between the P concurrently transmitted streams;
    an analog-to-digital converter (ADC) coupled to said radio demodulation section; and
    a packet detector coupled to said ADC, including;

a correlation unit that provides a correlation function based on P acquisition fields corresponding to said P concurrently transmitted streams employing a single correlation corresponding to said P acquisition fields having a sequence and P circular-shifted repetitions of said sequence to provide said correlation function, said single correlation employing a summation of said sequence and said P circular-shifted repetitions of said sequence; and a pseudo-magnitude calculator, coupled to said correlation unit, that calculates a packet detection metric based on said correlation function.

4. The receiver as recited in claim 3 wherein said pseudo-magnitude calculator further employs a threshold circuit having a threshold value with said packet detection metric to provide a packet detection signal.

* * * * *